(12) United States Patent
Hwang et al.

(10) Patent No.: US 9,671,218 B2
(45) Date of Patent: Jun. 6, 2017

(54) DEVICE AND METHOD OF QUICK SUBPIXEL ABSOLUTE POSITIONING

(71) Applicant: NATIONAL CHUNG SHAN INSTITUTE OF SCIENCE AND TECHNOLOGY, Longtan Township (TW)

(72) Inventors: Yi-Yuh Hwang, Taipei (TW); Wei-Guo Chang, Taoyuan (TW); Chin-Der Hwang, Zhubei (TW); Guang-Sheen Liu, Zhongli (TW); Wen-Jen Lin, Zhongli (TW); Ping-Ya Ko, Longtan Township (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 121 days.

(21) Appl. No.: 14/578,597

(22) Filed: Dec. 22, 2014

(65) Prior Publication Data
US 2016/0178347 A1    Jun. 23, 2016

(51) Int. Cl.
*G01B 11/02* (2006.01)
*G01B 11/00* (2006.01)
*G01B 9/02* (2006.01)

(52) U.S. Cl.
CPC ........ *G01B 11/002* (2013.01); *G01B 9/02094* (2013.01)

(58) Field of Classification Search
CPC ... G01B 11/002–11/007; G01B 11/026; G01B 11/03; G01B 11/14;
(Continued)

(56) References Cited

U.S. PATENT DOCUMENTS 3,224,323 A * 12/1965 Chitayat ............... G01B 11/26
33/1 L
4,299,492 A * 11/1981 Etzel ..................... G01B 11/14
356/486

(Continued)

*Primary Examiner* — Kara E Geisel
*Assistant Examiner* — Rufus Phillips
(74) *Attorney, Agent, or Firm* — Schmeiser, Olsen & Watts, LLP

(57) ABSTRACT

A quick subpixel absolute positioning device and method are introduced. The method includes the steps of (A) capturing a real-time speckle pattern of a target surface; (B) providing a coarse-precision speckle coordinate pattern and a plurality of fine-precision speckle coordinate patterns, wherein the coarse-precision speckle coordinate pattern and the fine-precision speckle coordinate patterns include a coordinate value; (C) comparing the real-time speckle coordinate pattern with the coarse-precision speckle coordinate pattern by an algorithm and then comparing the real-time speckle coordinate pattern with the fine-precision speckle coordinate patterns to obtain a coordinate value, wherein each said coarse-precision speckle coordinate pattern corresponds to a set of fine-precision speckle coordinate patterns, and the fine-precision speckle coordinate patterns are obtained when the coarse-precision speckle coordinate pattern is captured again and then captured repeatedly according to a fixed fine-precision displacement distance. Accordingly, the subpixel positioning is attained by quick comparison and manifests high precision.

9 Claims, 5 Drawing Sheets

(58) Field of Classification Search
CPC ... G01B 11/26–11/272; G01B 9/02094; G01C 3/08; G01S 17/08
See application file for complete search history.

(56) References Cited

U.S. PATENT DOCUMENTS

| | | | | |
|---|---|---|---|---|
| 4,350,443 | A * | 9/1982 | Williamson | G01B 9/02094 250/237 G |
| 5,811,826 | A * | 9/1998 | Shirley | G01B 11/26 250/559.29 |
| 6,642,506 | B1 * | 11/2003 | Nahum | G01B 3/205 250/231.13 |
| 7,433,024 | B2 * | 10/2008 | Garcia | G01B 11/2545 356/4.01 |
| 7,460,237 | B1 * | 12/2008 | Cramer | G03F 7/70625 355/55 |
| 8,538,085 | B2 * | 9/2013 | Yang | G01B 11/026 382/106 |
| 8,638,991 | B2 * | 1/2014 | Zalevsky | A61B 5/024 348/169 |
| 2012/0113252 | A1 * | 5/2012 | Yang | G01B 11/2441 348/135 |
| 2012/0123748 | A1 * | 5/2012 | Aben | G03F 7/70483 703/2 |
| 2013/0230208 | A1 * | 9/2013 | Gupta | G01C 21/206 382/103 |

\* cited by examiner

DEVICE AND METHOD OF QUICK SUBPIXEL ABSOLUTE POSITIONING

FIELD OF TECHNOLOGY

The present invention relates to positioning methods, and more particularly, to a speckle subpixel absolute positioning method.

BACKGROUND

Plenty of CCD automatic positioning products use a camera to take patterns of a workpiece, perform geometrical match positioning, grayscale match positioning, centric visual positioning, pattern positioning, and automatic tracking positioning with the comparison and positioning functions of conventional software to automatically calculate a displacement vector required for attaining positioning coordinates, and eventually control the motion of a multi-axis translation stage to effectuate precise smart positioning. However, CCD automatic positioning technology basically involves taking patterns of a workpiece by a CCD and then comparing pattern grayscale, and in consequence the precision of comparison and positioning depends on the contrast and sharpness of pattern grayscale distribution. This is conducive to the manufacturing of objects with space high frequency such that their grayscale patterns manifest high contrast and sharpness, thereby enhancing the precision of pattern comparison and positioning. Hence, identification and positioning object surfaces with space high frequency are difficult to produce and incur high production costs.

Invariant speckle patterns are interference speckle patterns generated from a sensor imaging surface as a result when a laser beam falls on an object surface and is scattered by the three-dimensional texture of the object surface. Invariant speckle patterns display feature speckles which correspond to the three-dimensional texture of the object surface according to a one-to-one relationship to thereby position the three-dimensional object surface texture precisely. With laser speckles being interference speckles, a fully destructive light field (dark points) can be converted into a fully constructive light field (bright points) at a wavelength (of about 1 μm) displacement to obtain grayscale patterns which manifest very high contrast and sharpness and thus enable precise positioning of speckle patterns. Since speckle feature points have a one-to-one relationship with the three-dimensional texture of the object surface, they are useful in identifying and positioning invariant speckle patterns and thus identifying and positioning the three-dimensional texture of the object surface precisely.

However, the prior art fails to achieve both positioning precision and positioning speed of invariant speckle patterns simultaneously. Although a pattern comparison and positioning method, such as NCC (Normalized Cross Correlation), SAD (Sun of Absolute Difference), and SSD (Sum of Square Difference), is capable of speedy pattern comparison and positioning, its pattern comparison and positioning precision is restricted by the pixel size of an image sensor. Although a multi-point positioning method, such as SIFT (Scale Invariant Feature Transform) and SURF (Speed-Up Robust Features), achieves high precision of subpixel positioning when calculating pattern features, its calculation-related data is so voluminous that it slows down pattern positioning.

Accordingly, it is necessary to develop a speckle pattern comparison method for performing positioning speedily and precisely so as to strike a balance between high positioning precision and high positioning speed and make good use of invariant speckle pattern comparison in order to effectuate precise positioning.

SUMMARY

In view of the aforesaid drawbacks of the prior art, it is an objective of the present invention to provide a subpixel absolute positioning method for integrating a real-time speckle pattern, a coarse-precision speckle coordinate pattern, a fine-precision speckle coordinate pattern, and an algorithm, so as to perform comparison and subpixel positioning quickly and precisely.

In order to achieve the above and other objectives, the present invention provides a subpixel absolute positioning method which comprises the steps of: (A) capturing a real-time speckle pattern of a target surface; (B) providing a coarse-precision speckle coordinate pattern and a plurality of fine-precision speckle coordinate patterns, wherein the coarse-precision speckle coordinate pattern and the fine-precision speckle coordinate patterns include a coordinate value; (C) comparing the real-time speckle pattern with the coarse-precision speckle coordinate pattern by an algorithm, and then comparing the real-time speckle pattern with the fine-precision speckle coordinate patterns by the algorithm so as to obtain a coordinate value, wherein each coarse-precision speckle coordinate pattern corresponds to a set of fine-precision speckle coordinate patterns, and the set of fine-precision speckle coordinate patterns are obtained when the coarse-precision speckle coordinate pattern is captured again and then captured repeatedly according to a fixed fine-precision displacement distance.

The algorithm in step (C) is one of SAD (Sum of Absolute Difference), SSD (Sum of Square Difference), NCC (Normalized Cross Correlation), SIFT (Scale Invariant Feature Transform), and SURF (Speed-Up Robust Features).

According to the present invention, in step (B), each coarse-precision speckle coordinate pattern or fine-precision speckle coordinate pattern includes a coordinate value. The coordinate value is a linear coordinate value or an angle coordinate value. When the coordinate value is a linear coordinate value, the coarse-precision speckle coordinate pattern is disposed in a coarse-precision speckle coordinate pattern database, and the fine-precision speckle coordinate patterns are disposed in a fine-precision speckle coordinate pattern database, or both the coarse-precision speckle coordinate pattern and fine-precision speckle coordinate patterns are disposed in the same speckle coordinate pattern database.

The coarse-precision speckle coordinate pattern database is created by following the steps of: specifying a measurement starting point on the target surface, capturing the first coarse-precision speckle coordinate pattern with an invariant speckle pattern-capturing device, specifying the coarse-precision speckle coordinate pattern coordinate with a laser interferometer, moving the target by a coarse-precision speckle coordinate pattern displacement with a servo motor, capturing the second coarse-precision speckle coordinate pattern with the invariant speckle pattern-capturing device, recording the displacement of the laser interferometer to specify the second coarse-precision speckle coordinate pattern coordinate, and repeating the above steps to finish creating the coarse-precision speckle coordinate pattern. The coarse-precision speckle coordinate pattern database is created by retrieving the positioning-oriented coarse-precision speckle coordinate pattern in accordance with the rule as follows:

$$D \geq 2\Delta, \epsilon \geq \tfrac{1}{2}D, \Delta + \epsilon = D$$

D: range of the capturing of the coarse-precision speckle coordinate pattern

Δ: displacement of two adjacent coarse-precision speckle coordinate patterns

ε: range of the overlapped capturing of two adjacent coarse-precision speckle coordinate patterns The fine-precision speckle coordinate pattern database is created by following the steps of: (A) moving a target by a fine-precision displacement with the servo motor immediately after the first coarse-precision speckle coordinate pattern has been captured, capturing the first fine-precision speckle coordinate pattern with the invariant speckle pattern-capturing device, recording the first fine-precision speckle coordinate pattern coordinate specified by a laser interferometer according to a displacement, and repeating the above steps to capture the other fine-precision speckle coordinate patterns successively and finalize the retrieving of the first fine-precision speckle coordinate pattern relative to the first coarse-precision speckle coordinate pattern according to the interferometer positioning coordinate; and (B) repeating step (A) to capture the other fine-precision speckle coordinate patterns and positioning coordinates successively.

When the coordinate value is an angle coordinate value, the coarse-precision speckle angle coordinate pattern is disposed in a coarse-precision speckle angle coordinate pattern database, and the fine-precision speckle angle coordinate patterns are disposed in a fine-precision speckle angle coordinate pattern database, or both the coarse-precision speckle angle coordinate pattern and fine-precision speckle angle coordinate patterns are disposed in the same speckle angle coordinate pattern database. The coarse-precision speckle angle coordinate pattern database is created by following the steps of: specifying a measurement starting angle on the target surface, capturing the first coarse-precision speckle angle coordinate pattern with an invariant speckle pattern-capturing device, specifying the coarse-precision speckle angle coordinate pattern coordinate with an angle positioning device, moving the target by a coarse-precision speckle angle coordinate pattern displacement angle with a servo motor, capturing the second coarse-precision speckle angle coordinate pattern with the invariant speckle pattern-capturing device, recording the angle positioning device's displacement angle to specify the second coarse-precision speckle angle coordinate pattern coordinate, and repeating the above steps to finish creating the coarse-precision speckle angle coordinate pattern. The angle positioning device is a laser interferometer, a laser gyroscope, or an optical fiber gyroscope.

The fine-precision speckle angle coordinate pattern database is created by following the steps of: (A) rotating a target by a fine-precision displacement angle with the servo motor immediately after the first coarse-precision speckle angle coordinate pattern has been captured, capturing the first fine-precision speckle angle coordinate pattern with the invariant speckle pattern-capturing device, recording the first fine-precision speckle angle coordinate pattern coordinate specified by an angle positioning device according to a displacement angle, and repeating the above steps to capture the other fine-precision speckle angle coordinate patterns successively and finalize the capturing of the first fine-precision speckle angle coordinate pattern relative to the first coarse-precision speckle angle coordinate pattern according to the angle positioning device positioning coordinate; and (B) repeating step (A) to capture the other fine-precision speckle angle coordinate patterns and positioning coordinates successively.

The above overview and the following description and drawings are intended to further explain the means and measures taken to achieve the predetermined objectives of the present invention and the effects of the present invention. The other objectives and advantages of the present invention are illustrated with the description and drawings below.

BRIEF DESCRIPTION

DETAILED DESCRIPTION

The implementation of the present invention is described with a specific embodiment below. By referring to the disclosure contained in this specification, persons skilled in the art can easily gain insight into the other advantages and effects of the present invention.

According to the present invention, capturing real-time speckle patterns of a target surface entails pattern-capturing of an invariant speckle. The invariant speckle pattern-capturing framework does not adopt mirror reflection (incident angle equals reflected angle) pattern-capturing framework, because a zero-order diffraction pattern characterized by incident angle equal to reflected angle and acquired by mirror reflection (incident angle equals reflected angle) pattern-capturing framework is likely to overlap with a high-order diffraction pattern of an adjacent object surface and thus amplify the small high-order diffraction signal, so as to vary the original zero-order diffraction pattern, thereby reducing speckle invariant characteristics greatly.

According to the present invention, an invariant speckle pattern-capturing framework measures speckle patterns in the direction of an incident angle ±10° and uses two optical apertures 21, 23 to stop speckle energy required for incident angle to equal reflection angle from entering image sensors. The pattern-capturing framework eliminates mirror reflection speckle noise and captures speckle patterns in the direction (of ±10° approximately) nearest to the incident angle (i.e., the pattern-capturing angle most likely to be capable of acquiring high incident energy) so as to obtain an invariant speckle pattern with the optimal signal-to-noise ratio.

Figure 1:
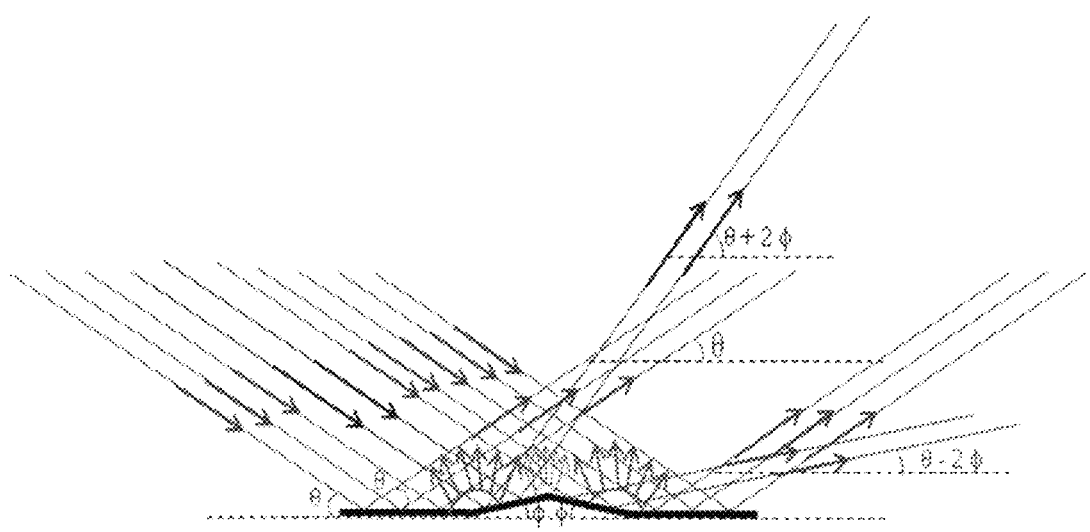
FIG. 1 is a schematic view of the distribution of laser beams scattering on a three-dimensional texture structure of a target surface according to the present invention.

Referring to FIG. 1, there is shown a schematic view of the distribution of laser beams scattering on a three-dimensional texture structure of a target surface. Referring to FIG.

2, there is shown a schematic view of a pattern-capturing structure of an invariant speckle capturing device according to the present invention. As shown in the diagrams, a large flat object surface in the three-dimensional texture structure of the target surface is regarded as formed by joining many small object surfaces of a small angle. The small angle is defined as the included angle between the normal to the small object surfaces and the normal to the large flat object surface. The small object surfaces differ in the normal, and their planes are regarded as optical planes conducive to small-area mirror reflection. The zone of joining small object surfaces in different directions can produce high-order diffraction light, which is the source of speckle noise. Referring to FIG. 1, the pattern-capturing surface of conventional speckle patterns is a flat object surface. The ratio and density of the three-dimensional texture structure of this flat object surface to the small object surface is the highest, wherein the included angle between the small object surface and the horizontal is zero degree; hence, the energy of the speckle patterns of the mirror reflection with the incident angle equal to the reflection angle is the largest, but it is also the pattern-capturing angle with the largest noise, because the speckles of mirror reflection of high density and zero-degree small object surface are likely to overlap with and interfere in the other high-order diffraction speckles to form speckle noise.

Figure 2:
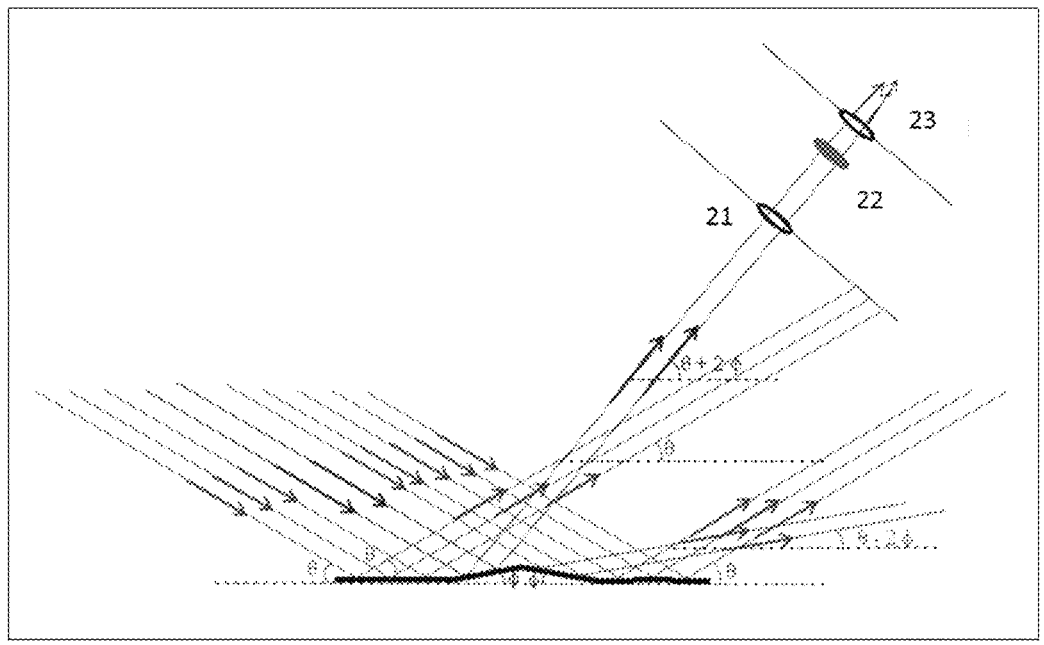
FIG. 2 is a schematic view of the pattern-capturing structure of an invariant speckle capturing device according to the present invention.

As revealed by optical reflection principles, when the incident angle changes by δ relative to the normal to the horizontal, the reflection angle changes by 2δ. When the pattern-capturing angle of a invariant speckle capturing device (not shown) deviates from the incident angle by 2ψ, the small object surface disposed in the initial three-dimensional texture structure of the object surface and formed an incident angle ψ with the horizontal plane turns into a pattern-capturing object surface of mirror reflection relative to the pattern-capturing structure of the aforesaid deviation angle of 2ψ. Referring to FIG. 2, if the initial incident light beam and the horizontal plane have an incident angle θ, then the small object surface which is disposed in the three-dimensional texture structure of the object surface and forms an incident angle 0° with the horizontal plane also has a mirror reflection angle θ. The mirror reflection light beam from the small object surface is blocked by the two optical apertures 21, 23 and thus denied access to two-dimensional image sensor. By contrast, the incident angle between the mirror reflection light beam of the small object surface, which is disposed in the three-dimensional texture structure of the object surface and formed an incident angle ψ with the horizontal plane, and the horizontal plane becomes θ+2ψ which is exactly the pattern-capturing angle of the invariant speckle pattern-capturing structure. The mirror reflection light beam from the small object surface with the included angle ψ is directly formed on the two-dimensional image sensor to form invariant feature speckle patterns. For example, when the small object surface is disposed in the three-dimensional texture structure of the object surface and forms an incident angle of 5° with the horizontal plane, the incident angle between its mirror reflection light beam and the horizontal plane becomes θ+10°. Furthermore, the invariant speckle pattern-capturing device of the present invention uses the two optical apertures 21, 23 to completely block the energy of the mirror reflection speckles of the 0° small object surface but allows the mirror reflection speckles of the 5° small object surface to enter the two-dimensional image sensor. The density of the mirror reflection speckles of the 5° small object surface is much lower than that of the 0° small object surface; hence, the high-order diffraction speckles are unlikely to overlap the mirror reflection speckles of the 5° small object surface to therefore produce speckle noise. As a result, the speckle pattern-capturing framework with a deviation angle of 10° is effective in obtaining the speckle patterns with the optimal signal-to-noise ratio, wherein the 5° small object surface is exactly the speckle pattern imaging object surface of the pattern-capturing framework with a deviation angle of 10°, that is, the invariant speckle feature small object surface. Given the feature small object surface, speckle patterns are formed on the imaging surface of a two-dimensional image sensor according to the optical imaging principle; since this is the imaging point of mirror reflection, the phases of the light field within the imaging point are consistent, so as to form bright points speckles, which are the invariant speckle pattern feature points.

Since the present invention adopts an invariant speckle pattern-capturing framework with a deviation angle of 10°, its invariant feature object surface is the 5° small object surface of the three-dimensional object surface texture, whereas, given the mirror reflection speckle patterns of the 5° small object surface, the speckle patterns on the pattern plane and the 5° small object surface of the object plane are enlarged in the same proportion by optical magnifying power M according to the imaging principle. Hence, it is feasible to form on the pattern plane the speckle pattern groups resulting from subpixel cutting by cutting the object plane pattern-capturing continuously on the object plane in accordance with continuous subpixel displacement. Once the fill factor of the two-dimensional image sensor approximates to 100% and the energy change caused by subpixel displacement at image sensing pixels is larger than image sensor background noise, it will be practicable to use pattern comparison and positioning methods, such as SAD (Sum of Absolute Difference), SSD (Sum of Square Difference), and NCC (Normalized Cross Correlation), to precisely compare and position the speckle patterns resulting from the displacement of each subpixel and thus perform precise subpixel positioning on the object surface.

Figure 3:
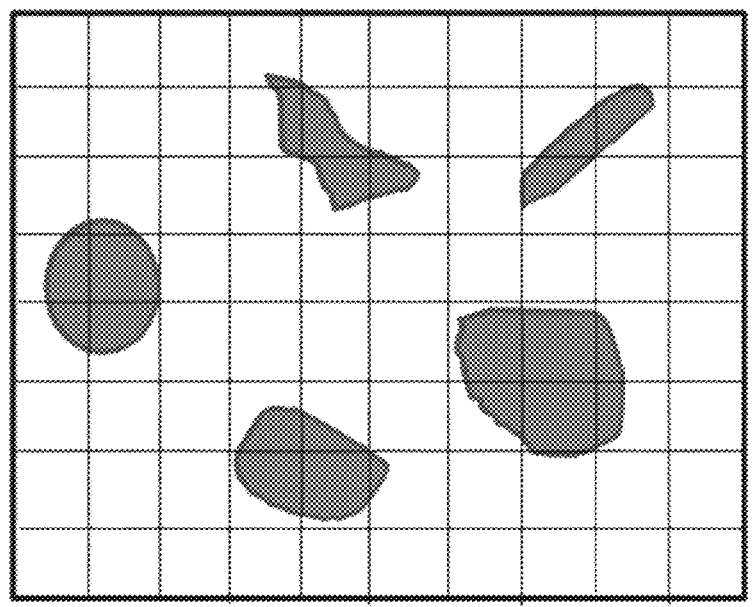
FIG. 3 is a schematic view of an invariant speckle pattern formed with a two-dimensional pattern sensor according to the present invention.
Figure 4:
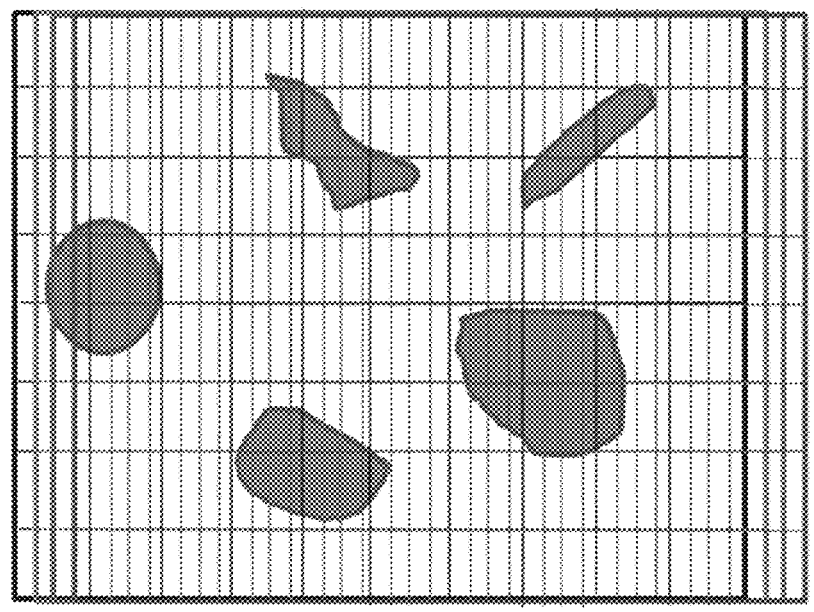
FIG. 4 is a schematic view of a subpixel cutting speckle pattern according to the present invention.

Referring to FIG. 3, there is shown a schematic view of an invariant speckle pattern formed on a two-dimensional pattern display unit according to the present invention. Referring to FIG. 4, there is shown a schematic view of a subpixel cutting speckle pattern according to the present invention. Although an pattern comparison and positioning method, such as NCC, SAD, and SSD, is capable of speedy pattern comparison and positioning, its positioning precision is restricted by the pixel size of an pattern-capturing device sensor (detector) for use in capturing speckle patterns. The cutting speckle pattern pattern-capturing technology is effective in capturing a plurality of fine-precision speckle coordinate patterns which manifest subpixel positioning precision. Then, the fine-precision speckle coordinate pattern groups are compared and positioned with a positioning method, such as NCC, SAD, and SSD, in accordance with the principle of pattern comparison, to attain subpixel positioning precision, thereby overcoming the limit of one initial pixel positioning precision. Referring to FIG. 3 and FIG. 4, in the situation where an imaging lens 22 of the invariant speckle pattern pattern-capturing device has a magnifying power M=1, to capture speckle patterns of ¼ pixel positioning precision, it is necessary to move the speckle pattern-capturing device by a distance of ¼ pixel size (fine-precision displacement) so as to cut the object plane, wherein 4 (1+3=4) pieces of corresponding fine-precision speckle patterns can be captured by moving for a distance of ¼ pixel thrice. Since the invariant speckle pattern is the mirror reflection pattern of the 5° small object surface, it is feasible to distinguish ¼ pixels of the 5° small object surface pattern in the two-dimensional image sensor by moving for a distance of ¼ pixel thrice and performing pattern-capturing four times successively. It will be feasible to use pattern quick comparison and positioning methods, such as NCC, SAD, and SSD, to compare and position four fine-precision speckle coordinate patterns of ¼ pixel displacement, that is, attain subpixel positioning precision of ¼ pixel displacement of the target surface (object surface), provided that the pattern fill factor of the two-dimensional image sensor of the pattern-capturing device approximates to 100% and the system pattern-capturing noise is less than a signal difference which occurs to the pattern sensor due to ¼ pixel displacement.

However, while subpixel displacement speckle pattern-capturing is taking place on the object plane (target surface), the finer the subpixel cutting, the more the speckle coordinate database patterns, and the lower the comparison and positioning speed. For instance, with a speckle resolver of a speckle pattern-capturing diameter of 20 cm and a speckle pattern-capturing circumference of 62.8 cm or so, and given the speckle positioning precision requirement of a pixel (of a size of 10 μm), the displacement of two adjacent coordinate speckle patterns equals 10 μm; hence, the speckle coordinate pattern database in its entirety requires creating 62.8 k (62.8 cm/10 μm=62800) speckle coordinate patterns. If the positioning precision requirement is 1/10 pixel (1 μm), the displacement of two adjacent coordinate speckle patterns equals 1 μm; hence, the speckle coordinate pattern database in its entirety requires creating 628K (62.8 c m/1 μm=628000) speckle coordinate patterns. As a result, the tenfold increase in data causes the number of instances of real-time speckle pattern comparison and positioning to increase tenfold, cause a tenfold increase in the time taken to effectuate comparison and positioning, and decrease the positioning speed tenfold.

Figure 5:
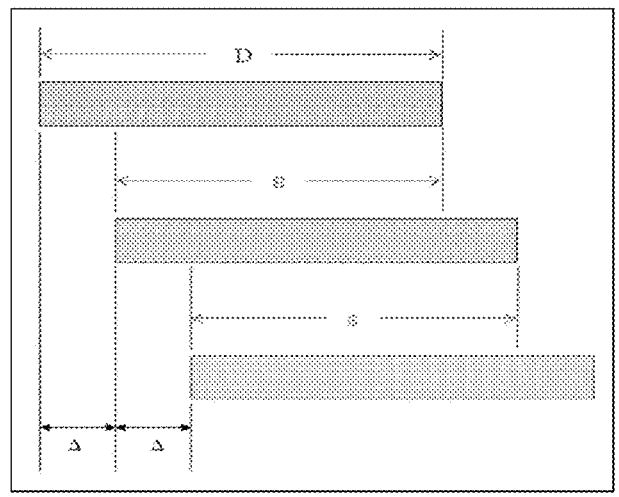
FIG. 5 is a schematic view of a coarse-precision speckle coordinate pattern pattern-capturing structure according to the present invention.

Referring to FIG. 5, there is shown a structural schematic view of coarse-precision speckle coordinate pattern pattern-capturing according to the present invention. To solve the aforesaid problems, the present invention discloses a speckle pattern precise dual-database comparison and positioning method to solve the problem with the incompatibility between positioning precision and positioning speed, wherein the principles of creating a coarse-precision speckle database are as follows:

1. Determine the distance L by which an invariant speckle pattern of an invariant speckle pattern-capturing device is moved by the displacement of two adjacent coarse-precision speckle patterns Δ, wherein, if it is less than the speckle invariant movable distance L, i.e., Δ<L, it will be guaranteed that speckle pattern displacement comparison performed with a method like SAD, SSD, NCC, SIFT, or SURF can accurately compare the displacement of the two adjacent speckle patterns, thereby achieving comparison and positioning precision to a pixel size;

2. The coarse-precision speckle coordinate pattern pattern-capturing range D designed must be less than or equal to the speckle invariant movable distance (D≤L) of the speckle pattern pattern-capturing device but larger than the twofold length (D≥2Δ) of the pattern-capturing displacement (Δ) of two adjacent coarse-precision speckle coordinate patterns, wherein the overlapped pattern-retrieving range ε of the two adjacent coarse-precision speckle coordinate patterns must be larger than ½ of the coarse-precision speckle coordinate pattern pattern-capturing range (ε≥½D), as shown in FIG. 5, the sum of the coarse-precision speckle coordinate pattern pattern-capturing displacement (Δ) and the overlapped pattern-capturing range ε of the two adjacent coarse-precision speckle coordinate patterns equals the coarse-precision speckle coordinate pattern pattern-capturing range D (Δ+ε=D). The two coarse-precision speckle coordinate patterns within the overlapped pattern-capturing range manifest almost identical speckle patterns, because their speckle patterns have smaller displacement than the speckle invariant displacement; hence, a quick comparison and positioning method, such as SAD, SSD, or NCC, can be performed to compare speckle pattern displacements in order to calculate precisely the displacement vectors of the two adjacent coordinate speckle patterns.

The process flow of a method of creating a coarse-precision speckle coordinate pattern according to the present invention is as follows:

A. In the linear coordinate field, with a laser interferometer mounted on a speckle pattern-capturing device, at a starting point within an operating range, capture the first speckle coordinate pattern with an invariant speckle pattern-capturing device, specify the speckle pattern coordinate as x1=0 coordinate with a laser interferometer (by resetting a location measurement of the laser interferometer to be 0, wherein x1=0), move a speckle pattern capturing device for a distance of Δ with a servo motor, capture the second speckle coordinate pattern with the invariant speckle pattern-capturing device, record the displacement measurement x2 of the laser interferometer, set the coordinate value of the second speckle coordinate pattern to x2; repeat the aforesaid steps, move the speckle pattern capturing device for a distance of Δ, capture the third speckle coordinate pattern and its interferometer coordinate measurement x3, . . . , move the speckle pattern capturing device for a distance of Δ, capture the $n^{th}$ speckle coordinate pattern and its interferometer coordinate measurement xn, finish the filing of n pieces of coarse-precision speckle coordinate patterns when xn measurement is larger than the operating range, file n interferometer coarse-precision speckle coordinate location measurements, and end the process of creating the coarse-precision speckle database of linear displacement.

B. In the rotating coordinate field, with a precise angle measurement apparatus, such as a laser interferometer, a laser gyroscope, or an optical fiber gyroscope, mounted on a speckle resolver pattern-capturing device, at the location specified as 0° by the resolver, capture the first speckle coordinate pattern with the invariant speckle pattern-capturing device, specify the angle coordinate measurement of the speckle angle coordinate pattern as θ1=0° with a precise angle measurement apparatus, such as a laser interferometer, a laser gyroscope, or an optical fiber gyroscope, rotate the resolver with the servo motor to specify the speckle pattern-capturing tangential displacement of the resolver as Δ, capture the second speckle angle coordinate pattern with the invariant speckle pattern-capturing device, record angle measurements θ2 of a precise angle measurement apparatus, such as a laser interferometer, a laser gyroscope, or an optical fiber gyroscope, such that the angle coordinate value of the second speckle angle coordinate pattern is θ2; repeat the above steps and then rotate the resolver such that the speckle pattern-capturing tangential displacement of the resolver is Δ, capture the third speckle angle coordinate pattern and its angle coordinate measurement θ3 and then rotate the resolver, capture the $n^{th}$ speckle angle coordinate pattern and its angle coordinate measurement θn, confirm that the $n^{th}$ speckle angle coordinate pattern has gone beyond the first speckle angle coordinate pattern or compare the $n^{th}$ speckle angle coordinate pattern with the first speckle angle coordinate pattern when θn measurement is larger than 360°, finish the filing of n pieces of speckle angle coordinate patterns and n angle coordinate measurements, and end the process of creating the coarse-precision speckle database of the speckle resolver.

Figure 6:
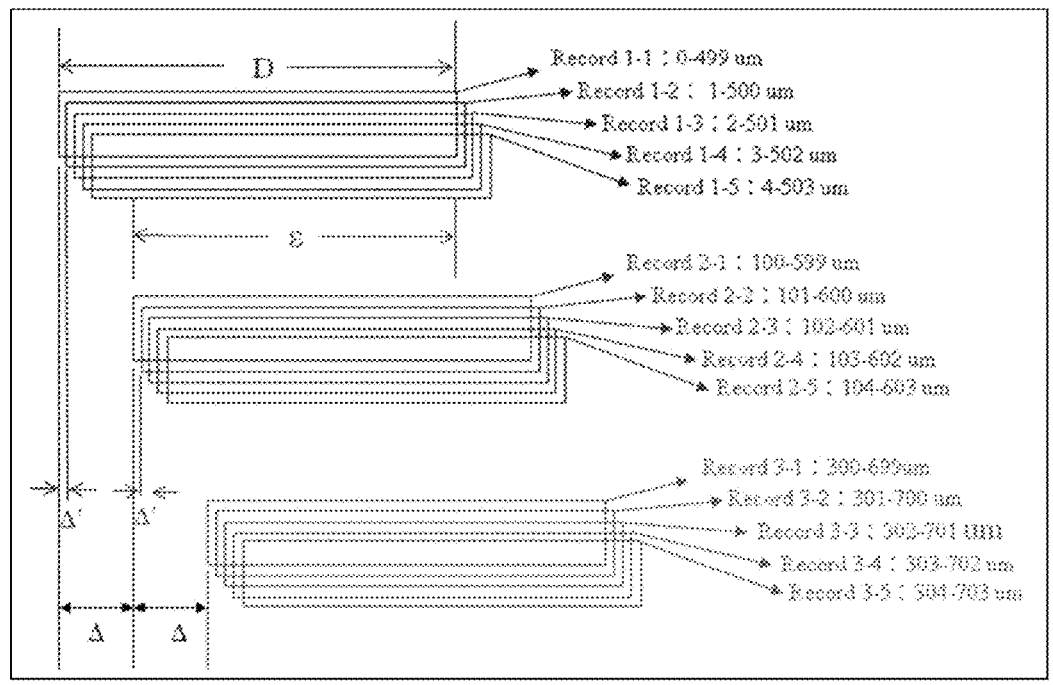
FIG. 6 is a schematic view of a fine-precision speckle coordinate pattern pattern-capturing structure according to the present invention.

Referring to FIG. 6, there is shown a schematic view of a fine-precision speckle coordinate pattern pattern-capture structure of the present invention. As shown in the diagram, the rule of the creation of the fine-precision speckle coordinate pattern of the present invention is as follows: use a single invariant speckle pattern-capturing device to create coarse-precision speckle coordinate patterns and fine-precision speckle coordinate patterns, set the magnifying power of the imaging lens 22 of the invariant speckle pattern-capturing device to M, set a pixel size of two-dimensional image sensors to η, set the displacement of two adjacent coarse-precision speckle coordinate patterns on the object plane to Δ, which is equivalent to N pixels on the pattern plane, such that N pixel distance equals the product of the magnifying power of the imaging lens 22 and Δ(Nη=M×Δ), drive the speckle capturing device to move for a distance across the object plane with the servo motor, perform pattern-capturing continuously, so as to capture a coarse-precision speckle coordinate pattern in each instance of moving N pixels across the pattern plane of the two-dimensional image sensors. Likewise, the fine-precision displacement on the object plane relative to the displacement on the pattern plane is expressed by δ=M×Δ'. Therefore, to satisfy the fine-precision displacement Δ' on the object plane, a sensor pixel η on the image plane must be cut into P portions, that is, it is necessary to create a fine-precision speckle coordinate pattern of 1/P subpixel, wherein P=η/δ; since each coarse-precision coordinate speckle pattern is the first fine-precision speckle coordinate pattern of P subpixel fine-precision speckle coordinate patterns corresponding to the coarse-precision coordinate speckle pattern, a method of creating P pieces of subpixel fine-precision coordinate speckle patterns comprises driving the speckle capturing device to perform pattern-capturing continuously by a displacement (fine-precision displacement) with the servo motor as soon as each coarse-precision speckle coordinate pattern has been captured, capturing (P-1) pieces of fine-precision speckle coordinate patterns, determining the location measurement of each fine-precision speckle coordinate pattern with the interferometer, and integrating the first fine-precision speckle coordinate pattern and the subsequent (P-1) pieces of fine-precision speckle coordinate patterns to finalize the filing of the coarse-precision coordinate speckle pattern of speckle capturing device pattern-capturing and the filing of the corresponding P pieces of fine-precision speckle coordinate patterns.

The process flow of a method of creating a fine-precision speckle coordinate pattern according to the present invention is as follows: capture fine-precision speckle coordinate patterns by a fine-precision displacement Δ' immediately after the first coarse-precision speckle coordinate pattern pattern-capturing; move the invariant speckle capturing device P-1 times to therefore capture P-1 pieces of fine-precision speckle coordinate patterns continuously in each instance of moving a distance of Δ'; determine the positioning measurements of the interferometer to therefore finalize P pieces of fine-precision speckle coordinate patterns corresponding to the first coarse-precision speckle coordinate pattern, wherein the fine-precision speckle coordinate pattern reference numbers are 1-1, 1-2, . . . , 1-P, wherein the location measurement before the reference number denotes the coarse-precision coordinate pattern reference number, whereas the location measurement behind the reference number denotes the fine-precision coordinate pattern reference number corresponding to the coarse-precision coordinate pattern, wherein the fine-precision speckle coordinate pattern of reference number 1-1 is the first coarse-precision coordinate pattern, such that the filing of the first coarse and fine speckle coordinate patterns and their location coordinate measurement data is finished; after the filing of the first coarse and fine-precision coordinate data has been finished, move the invariant speckle capturing device for a distance of [Δ-(P-1)Δ'] to reach the second coarse-precision speckle coordinate pattern location, capture the speckle pattern at this location, record location measurements of the interferometer at this location, finish the filing of the second coarse-precision speckle coordinate pattern and the (2-1)$^{th}$ fine-precision speckle coordinate pattern, move the speckle reader for a distance of Δ', capture the (2-2)$^{th}$ fine-precision speckle coordinate patterns and record the location measurements of the interferometer at this location, finish the filing of the (2-2)$^{th}$ fine-precision speckle coordinate pattern, finish the filing of the (2-P)$^{th}$ fine-precision speckle coordinate pattern, finish the filing of the second coarse and fine speckle coordinate patterns and their location coordinate measurement data; follow the aforesaid steps to move the speckle capturing device to the third coarse-precision speckle coordinate pattern location to therefore perform pattern-capturing continuously, finish the filing of the third coarse and fine speckle coordinate patterns and their location coordinate measurements data, repeat the aforesaid steps, finish the filing of the n$^{th}$ coarse and fine speckle coordinate patterns and their location coordinate measurements data; create all the coarse and fine speckle coordinate patterns when the n$^{th}$ coarse-precision speckle coordinate location is larger than or equal to the preset length of a speckle ruler, finish creating n pieces of coarse-precision speckle coordinate patterns, and finish the filing of (n×P) pieces of fine-precision speckle coordinate patterns and the database of their location coordinate measurements, wherein n coordinate patterns are coarse and fine speckle patterns.

Embodiment

Figure 7:
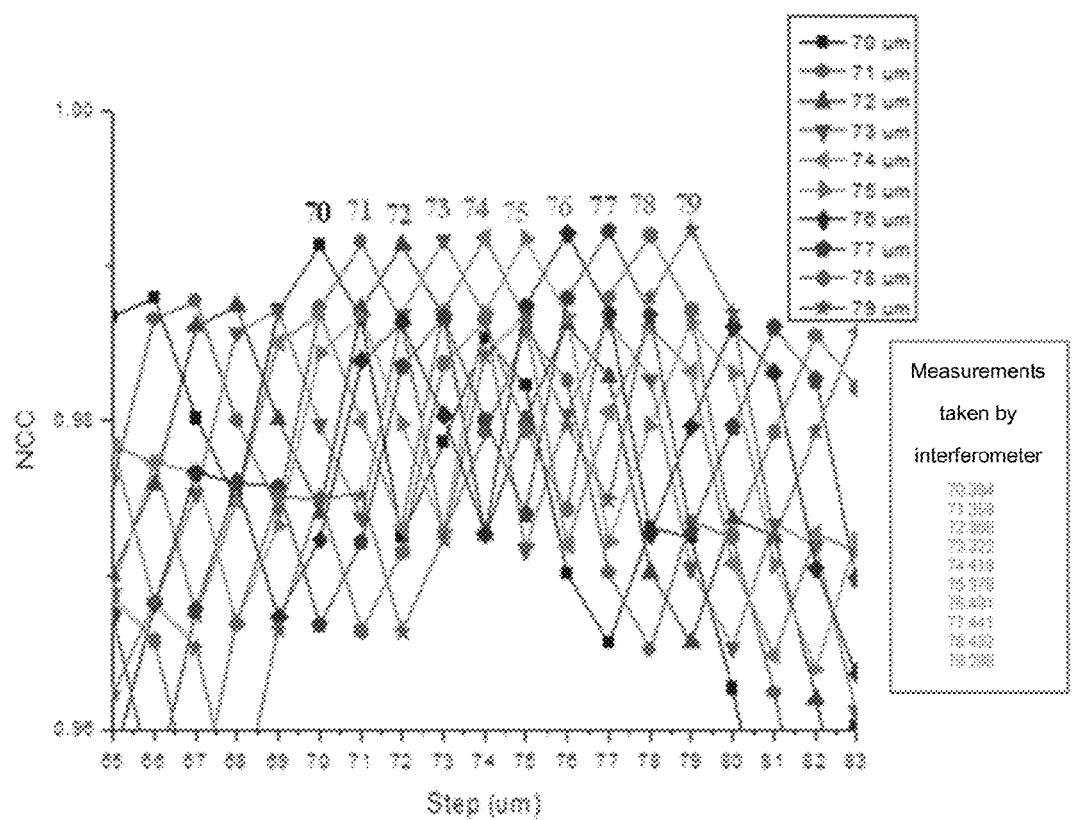
FIG. 7 is a schematic view of measuring fine-precision speckle coordinate pattern data directly with an Agilent 5530 laser interferometer and the results of experiments conducted with a subpixel absolute positioning method according to the present invention.

Referring to FIG. 7, there is shown a schematic view of fine-precision speckle coordinate pattern data directly measured with an Agilent 5530 laser interferometer according to the present invention and the experiment results of a subpixel absolute positioning method of the present invention. According to the present invention, an invariant speckle capturing device with an imaging lens of a focal length f=13.5 m, a SONY XCL-5005 CCD (pixel size 3.45 μm) and an imaging lens optical magnifying power M=1, captures the speckle patterns for precision positioning verification. An experiment of comparison and positioning of speckle pattern subpixels is carried out to attain fine positioning precision of 1 μm. First, create fine-precision speckle coordinate patterns, wherein a speckle pattern is taken at each instance of a displacement of 1 μm, adopt 128*128 matrix of patterns to take 500 speckle patterns, record the location measurements of each fine-precision speckle coordinate pattern synchronously with the Agilent 5530 laser interferometer, and create the location coordinates of a fine-precision speckle coordinate pattern database; afterward, capture real-time speckle patterns at 50 locations successively by moving for a distance of 1 μm each time, so as to capture a total of 50 real-time speckle patterns, record real-time location measurements of the 50 speckle patterns synchronously with the 5530 laser interferometer, compare temp plates of a 32*32 array pattern with a comparison method, such as NCC, compare the 50 real-time speckle patterns with 500 fine-precision speckle coordinate patterns in the database, and identify the coordinate locations of the 50 real-time speckle patterns. Referring to FIG. 7, location measurements along a horizontal axis formed from speckle database patterns at 10 points are compared successively, whereas real-time speckle patterns which form the vertical axis are compared with database patterns to figure out NCC comparison values. Referring to FIG. 7, which shows the location measurements of the real-time speckle patterns at the aforesaid 10 points when measured with the 5530 laser interferometer, and it shows that the result of comparing the 70-79 μm real-time speckle patterns at 10 locations with the database coordinate speckle patterns is fully consistent with the result of comparing them with location measurements measured by the 5530 laser interferometer, whereas the result of positioning all the 50 real-time speckle pattern positioning points is fully consistent with that the result yielded by the 5530 laser interferometer positioning, thereby proving that the speckle subpixel positioning method of the present invention is practicable.

Embodiment and Comparison

With a speckle ruler which is one meter long, to attain absolute positioning precision of 1 μm, it is feasible to perform comparison by the positioning precision and positioning speed of various positioning methods, wherein a two-dimensional image sensor has a pixel with a diameter of 5 μm (η=5 μm), and the imaging lens 22 of the invariant speckle pattern capturing device has an optical magnifying power of 1 (M=1), wherein speckle pattern comparison and positioning calculation at a rate of 10 kHz.

Method 1: given the invariant speckle subpixel cutting pattern-capturing technology disclosed by the present invention, move the speckle patterns successively for a distance of 1 μm, perform subpixel cutting pattern-capturing, determine the location measurement of each coordinate speckle pattern with the interferometer such that the speckle coordinate pattern database speckle patterns with positioning precision of 1 μm total one million (1 m/1 μm=1×10^6). The real-time speckle pattern initial positioning takes about 100 seconds (1×10^6/10^4=100) in order to boot the system.

Method 2: with the speckle pattern precise dual-database and the comparison and positioning method of the present invention, it is feasible to confirm that the movable distances of two adjacent coarse-precision speckle coordinate patterns are compared and positioned accurately according to invariable speckle capture device characteristics. Assuming that the distance between adjacent speckle patterns is 100 μm (Δ=100 μm), it is necessary to capture 10000 coarse-precision speckle coordinate patterns (1 m/100 μm=10000). Furthermore, with the subpixel cutting pattern-capturing technology of the present invention, upon completion of each instance of coarse-precision speckle coordinate pattern pattern-capturing, movement is successively carried out for a distance of 1 μm (Δ'=1 μm) four times (5 μm/1 μm−1=4), and then four other fine-precision speckle coordinate patterns are captured. Afterward, the coordinate measurements of each fine-precision speckle coordinate pattern are recorded with the interferometer. Hence, each coarse-precision speckle coordinate pattern has five corresponding fine-precision speckle coordinate patterns and five fine-precision positioning coordinates, wherein the first fine-precision speckle coordinate pattern is the original coarse-precision coordinate pattern. Hence, 50000 [(1 m/100 μm)×5=50000] fine-precision coordinate patterns are captured with the aforesaid method. Booting the system does not require comparing all the fine-precision speckle coordinate patterns, but requires comparing the real-time speckle pattern to be captured by a boot with the 10000 coarse-precision coordinate patterns in the coarse-precision speckle coordinate pattern database to therefore obtain the coarse-precision coordinate patterns closest to the real-time coordinate pattern, and then calling five fine-precision coordinate patterns created in accordance with the coarse-precision coordinate patterns, such that the real-time speckle pattern is compared with the five fine-precision coordinate patterns and positioned, so as to obtain a fine-precision coordinate speckle pattern closest to the real-time speckle pattern, wherein its fine-precision coordinate measurement is the positioning coordinate of the real-time speckle pattern. Therefore, the aforesaid positioning and comparison has to be carried out 10005 times (1 m/100 μm+5=10005), and it takes 0.1 second (10005/10^4≈1) or so (ignoring the time taken to read the fine-precision speckle coordinate patterns). With the method of the present invention, the time taken to carry out positioning and comparison with the speckle ruler which is a meter long to attain absolute positioning precision of 1 μm is reduced from 100 seconds to 1 second effectively, thereby proving that the method of the present invention is highly effective.

In the angle positioning field, the invariant speckle pattern dual-database positioning and comparison method is similar to that in linear displacement, as it requires comparing tangential displacement to linear displacement, wherein the circumference of the speckle resolver equals the length of the speckle ruler, and an interferometer functions as the speckle ruler to perform initial coordinate positioning, whereas a precise angle measurement apparatus, such as an interferometer, a laser gyroscope or an optical fiber gyroscope, functions as the speckle resolver to perform speckle resolver initial coordinate angle positioning. With the invariant speckle pattern dual-database positioning and comparison method, it is feasible to not only attain high angle positioning precision of the speckle resolver but also speed up speckle resolver comparison and positioning greatly.

The aforesaid embodiments are illustrative of the features and advantages of the present invention, but should not be interpreted as restrictive of the scope of the substantive technical contents of the present invention. Hence, modifications and variations can be made to the aforesaid embodiments by persons skilled in the art without departing from the spirit and scope of the present invention and should fall within the scope of the present invention. Accordingly, the legal protection for the present invention should be defined by the appended claims.

What is claimed is:

1. A quick subpixel absolute positioning method, comprising the steps of:
  capturing a real-time speckle pattern of a target surface with an invariant speckle pattern-capturing device;
  providing a plurality of coarse-precision speckle coordinate patterns and a plurality of sets of fine-precision speckle coordinate patterns from at least one storage device, wherein the coarse-precision speckle coordinate patterns correspond to the sets of the fine-precision speckle coordinate patterns, respectively, and each fine-precision speckle coordinate pattern of each set of fine-precision coordinate pattern includes a coordinate value; and
  comparing the real-time speckle pattern with the plurality of coarse-precision speckle coordinate patterns by an algorithm of a data processing device to select one of the coarse-precision speckle coordinate patterns, and then comparing the real-time speckle pattern with the set of fine-precision speckle coordinate patterns corresponding to the selected coarse-precision speckle coordinate pattern to select one of the fine-precision speckle coordinate patterns and use coordinate values of the selected fine-precision speckle coordinate pattern to position the real-time speckle pattern, wherein the selected fine-precision speckle coordinate patterns are obtained when the selected coarse-precision speckle coordinate pattern is captured again and then captured repeatedly according to a fixed fine-precision displacement distance, wherein relationship between the fine-precision displacement distance and subpixels is defined below:

$$\delta = M \times \Delta'$$

$$P = \eta/\delta$$

$$\Delta' = \eta/MP$$

δ: a fine-precision displacement distance of a pattern
M: magnifying power of an imaging lens of an invariant speckle pattern pattern-capturing device
Δ': a fine-precision displacement distance of an object
η: size of pixels of a sensor
P: number of cuts;

wherein the coarse-precision speckle coordinate pattern is disposed in a coarse-precision speckle coordinate pattern database;

wherein the coarse-precision speckle coordinate pattern is disposed in a coarse-precision speckle coordinate pattern database;

wherein the coarse-precision speckle coordinate pattern database is created by following the steps of: specifying a measurement starting point on the target surface, capturing the coarse-precision speckle coordinate pattern with an invariant speckle pattern-capturing device as the first coarse-precision speckle coordinate pattern, specifying the first coarse-precision speckle coordinate pattern coordinate with a laser interferometer, moving the target by a coarse-precision speckle coordinate pattern displacement with a servo motor, capturing the coarse-precision speckle coordinate pattern with the invariant speckle pattern-capturing device as the second coarse-precision speckle coordinate pattern, recording the displacement of the laser interferometer to specify the second coarse-precision speckle coordinate pattern coordinate, and repeating the steps to finish creating all of the coarse-precision speckle coordinate pattern;

wherein the coarse-precision speckle coordinate pattern database is created by capturing the positioning-oriented coarse-precision speckle coordinate pattern according to a rule below:

$$D \geq 2\Delta, \epsilon \geq \tfrac{1}{2}D, \Delta + \epsilon = D$$

D: range of the capturing of the coarse-precision speckle coordinate pattern
Δ: displacement of two adjacent coarse-precision speckle coordinate patterns
ε: range of the overlapped capturing of two adjacent coarse-precision speckle coordinate patterns;

wherein the fine-precision speckle coordinate pattern database is created by following the steps of:

moving a target by a fine-precision displacement with the servo motor immediately after the first coarse-precision speckle coordinate pattern has been captured, capturing the first fine-precision speckle coordinate pattern with the invariant speckle pattern-capturing device, recording the first fine-precision speckle coordinate pattern coordinate specified by a laser interferometer according to a displacement, and repeating the above steps to capture the other fine-precision speckle coordinate patterns successively, capture P−1 fine-precision speckle coordinate patterns, and finalize the capturing of the first fine-precision speckle coordinate pattern relative to the first coarse-precision speckle coordinate pattern according to the positioning device positioning coordinate; and repeating step (A) to capture the other fine-precision speckle coordinate patterns and positioning coordinates successively.

2. The subpixel absolute positioning method of claim 1, wherein the algorithm is one of SAD (Sum of Absolute Difference), SSD (Sum of Square Difference), and NCC (Normalized Cross Correlation).

3. The subpixel absolute positioning method of claim 1, wherein the coordinate values of the selected fine-precision speckle coordinate patter are an angle coordinate value.

4. The subpixel absolute positioning method of claim 3, wherein the coarse-precision speckle angle coordinate pattern is disposed in a coarse-precision speckle angle coordinate pattern database.

5. The subpixel absolute positioning method of claim 4, wherein the coarse-precision speckle angle coordinate pattern database is created by following the steps of: specifying a measurement starting angle on the target surface, capturing the coarse-precision speckle angle coordinate pattern with an invariant speckle pattern-capturing device as the first coarse-precision speckle angle coordinate pattern and, specifying the first coarse-precision speckle angle coordinate pattern coordinate with an angle positioning device, rotating the target by a coarse-precision speckle angle coordinate pattern displacement angle with a servo motor, capturing the coarse-precision speckle angle coordinate pattern with the invariant speckle pattern-capturing device as the second coarse-precision speckle angle coordinate pattern, and recording the angle positioning device's displacement angle to specify the second coarse-precision speckle angle coordinate pattern coordinate, and repeating the steps to finish creating all of the coarse-precision speckle angle coordinate pattern.

6. The subpixel absolute positioning method of claim 5, wherein the angle positioning device is one of a laser interferometer, a laser gyroscope, and an optical fiber gyroscope.

7. The subpixel absolute positioning method of claim 6, wherein the fine-precision speckle angle coordinate patterns are disposed in a fine-precision speckle angle coordinate pattern database.

8. The subpixel absolute positioning method of claim 7, wherein the fine-precision speckle angle coordinate pattern database is created by following the steps of:

rotating a target by a fine-precision displacement angle with the servo motor immediately after the first coarse-precision speckle angle coordinate pattern has been captured, capturing the first fine-precision speckle angle coordinate pattern with the invariant speckle pattern-capturing device, recording the first fine-precision speckle angle coordinate pattern coordinate specified by an angle positioning device according to a displacement angle, and repeating the above steps to capture the other fine-precision speckle angle coordinate patterns, capture P−1 fine precision speckle coordinate patterns, and finalize the capturing of the first fine-precision speckle angle coordinate pattern relative to the first coarse-precision speckle angle coordinate pattern according to the angle positioning device positioning angle coordinate; and repeating the capturing step to capture the other fine-precision speckle angle coordinate patterns.

9. A quick subpixel absolute positioning method, comprising the steps of:

capturing a real-time speckle pattern of a target surface with an invariant speckle pattern-capturing device;

providing a plurality of coarse-precision speckle coordinate patterns and a plurality of sets of fine-precision speckle coordinate patterns from at least one storage device, wherein the coarse-precision speckle coordinate patterns correspond to the sets of the fine-precision speckle coordinate patterns, respectively, and each fine-precision speckle coordinate pattern of each set of fine-precision coordinate pattern includes a coordinate value; and comparing the real-time speckle pattern with the plurality of coarse-precision speckle coordinate patterns by an algorithm of a data processing device to select one of the coarse-precision speckle coordinate patterns, and then comparing the real-time speckle pattern with the set of fine-precision speckle coordinate patterns corresponding to the selected coarse-precision speckle coordinate pattern to select one of the fine-precision speckle coordinate patterns and use coordinate values of the selected fine-precision speckle coordinate pattern to position the real-time speckle pattern, wherein the selected fine-precision speckle coordinate patterns are obtained when the selected coarse-precision speckle coordinate pattern is captured again and then captured repeatedly according to a fixed fine-precision displacement distance, wherein relationship between the fine-precision displacement distance and subpixels is defined below:

$\delta = M \times \Delta'$ $P = \eta/\delta$ $\Delta' = \eta/MP$ $\delta$: a fine-precision displacement distance of a pattern M: magnifying power of an imaging lens of an invariant speckle pattern pattern-capturing device $\Delta'$: a fine-precision displacement distance of an object $\eta$: size of pixels of a sensor P: number of cuts;

wherein the coarse-precision speckle angle coordinate pattern is disposed in a coarse-precision speckle angle coordinate pattern database;

wherein the coarse-precision speckle angle coordinate pattern is disposed in a coarse-precision speckle angle coordinate pattern database;

wherein the coarse-precision speckle angle coordinate pattern database is created by following the steps of:

specifying a measurement starting angle on the target surface, capturing the coarse-precision speckle angle coordinate pattern with an invariant speckle pattern-capturing device as the first coarse-precision speckle angle coordinate pattern and, specifying the first coarse-precision speckle angle coordinate pattern coordinate with an angle positioning device, rotating the target by a coarse-precision speckle angle coordinate pattern displacement angle with a servo motor, capturing the coarse-precision speckle angle coordinate pattern with the invariant speckle pattern-capturing device as the second coarse-precision speckle angle coordinate pattern, and recording the angle positioning device's displacement angle to specify the second coarse-precision speckle angle coordinate pattern coordinate, and repeating the steps to finish creating all of the coarse-precision speckle angle coordinate pattern;

wherein the angle positioning device is one of a laser interferometer, a laser gyroscope, and an optical fiber gyroscope;

wherein the fine-precision speckle angle coordinate patterns are disposed in a fine-precision speckle angle coordinate pattern database;

wherein the fine-precision speckle angle coordinate pattern database is created by following the steps of:

rotating a target by a fine-precision displacement angle with the servo motor immediately after the first coarse-precision speckle angle coordinate pattern has been captured, capturing the first fine-precision speckle angle coordinate pattern with the invariant speckle pattern-capturing device, recording the first fine-precision speckle angle coordinate pattern coordinate specified by an angle positioning device according to a displacement angle, and repeating the above steps to capture the other fine-precision speckle angle coordinate patterns, capture P–1 fine precision speckle coordinate patterns, and finalize the capturing of the first fine-precision speckle angle coordinate pattern relative to the first coarse-precision speckle angle coordinate pattern according to the angle positioning device positioning angle coordinate; and repeating the capturing step to capture the other fine-precision speckle angle coordinate patterns.

* * * * *